US009763060B2

(12) United States Patent
Zou (10) Patent No.: US 9,763,060 B2
(45) Date of Patent: Sep. 12, 2017

(54) STREAMING UNICAST SERVICES TO MULTIPLE USER EQUIPMENT (71) Applicant: Alcatel-Lucent USA Inc., Murray Hill, NJ (US)

(72) Inventor: Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 95 days.

(21) Appl. No.: 14/538,377

(22) Filed: Nov. 11, 2014

(65) Prior Publication Data

US 2016/0135016 A1   May 12, 2016

(51) Int. Cl.
*H04H 1/00* (2006.01)
*H04J 3/24* (2006.01)
(Continued)

(52) U.S. Cl.
CPC ............ *H04W 4/06* (2013.01); *H04M 15/66* (2013.01); *H04W 72/005* (2013.01); *H04W 72/042* (2013.01); *H04W 76/002* (2013.01)

(58) Field of Classification Search
CPC ............ H04J 2203/0019; H04L 12/18; H04L 12/184; H04L 12/1845; H04L 12/185; H04L 2012/5642; H04L 2012/6416; H04L 29/06455; H04L 29/08693; H04L 29/12292; H04L 47/806; H04L 49/201; H04L 65/4076
(Continued)

(56) References Cited

U.S. PATENT DOCUMENTS 8,514,756 B1 * 8/2013 Ramachandra ..... H04L 61/2069
370/310
8,897,204 B2 * 11/2014 Yi .......................... H04L 5/0053
370/315
(Continued)

FOREIGN PATENT DOCUMENTS

WO    2008/004031    1/2008
WO    2013/048514    4/2013

OTHER PUBLICATIONS

"General Packet Radio Service (GPRS) Enhancements for Evolved Universal Terrestrial Radio Access Network (E-UTRAN) Access", 3GPP TS 23.401 V13.0.0, Section 4.1-4.2, Sep. 1, 2014, 5 pages.
(Continued)

*Primary Examiner* — Chuong T Ho
(74) *Attorney, Agent, or Firm* — Davidson Sheehan LLP (57) ABSTRACT A content adapter receives a request from a first user equipment to receive a unicast service via a base station and determines that the base station is providing the unicast service to a second user equipment using a service identifier. The content adapter transmits a signal instructing the base station to allocate the service identifier to the first user equipment for receiving the unicast service concurrently with the second user equipment. A base station allocates the service identifier to the first user equipment in response to the first user equipment requesting a unicast service that the base station is already providing to a second user equipment using the service identifier. The base station transmits content for the unicast service for reception by the first and second user equipment based on the service identifier.

8 Claims, 8 Drawing Sheets (51) Int. Cl.
*H04W 4/06* (2009.01)
*H04W 72/00* (2009.01)
*H04M 15/00* (2006.01)
*H04W 72/04* (2009.01)
*H04W 76/00* (2009.01)

(58) Field of Classification Search
USPC .......................................................... 370/312
See application file for complete search history.

(56) References Cited

U.S. PATENT DOCUMENTS

| | | | | |
|---|---|---|---|---|
| 9,072,072 | B2* | 6/2015 | Zhang | H04W 76/002 |
| 9,179,481 | B2* | 11/2015 | Zhang | H04W 76/002 |
| 9,209,955 | B2* | 12/2015 | Damnjanovic | H04L 5/001 |
| 2010/0128648 | A1* | 5/2010 | Lee | H04W 74/002 |
| | | | | 370/312 |
| 2011/0154421 | A1* | 6/2011 | Chun | H04N 21/2385 |
| | | | | 725/109 |
| 2012/0269110 | A1* | 10/2012 | Walker | H04W 28/16 |
| | | | | 370/312 |
| 2012/0275369 | A1* | 11/2012 | Zhang | H04W 76/002 |
| | | | | 370/312 |
| 2012/0300696 | A1* | 11/2012 | Yi | H04L 5/0053 |
| | | | | 370/315 |
| 2013/0089048 | A1* | 4/2013 | Damnjanovic | H04L 5/001 |
| | | | | 370/329 |
| 2013/0111520 | A1* | 5/2013 | Lo | H04L 67/306 |
| | | | | 725/35 |
| 2013/0294321 | A1* | 11/2013 | Wang | H04W 4/06 |
| | | | | 370/312 |
| 2014/0010195 | A1* | 1/2014 | Angelow | H04J 11/0093 |
| | | | | 370/329 |
| 2015/0139063 | A1* | 5/2015 | Zhang | H04W 76/002 |
| | | | | 370/312 |
| 2015/0326360 | A1* | 11/2015 | Malladi | H04L 5/0032 |
| | | | | 370/329 |
| 2016/0374050 | A1* | 12/2016 | Prasad | H04W 4/06 |

OTHER PUBLICATIONS

"Group Communication System Enablers for LTE (GCSE_LTE)", 3GPP TS 23.468 V12.2.0, Sep. 1, 2014, 25 pages.
Partial International Search Report correlating to PCT/US2015/058640 dated Jul. 12, 2016, 6 pages.
International Search Report and Written Opinion correlating to PCT/US2015/058640 dated Sep. 5, 2016, 16 pages.

* cited by examiner

STREAMING UNICAST SERVICES TO MULTIPLE USER EQUIPMENT

BACKGROUND

Field of the Disclosure

The present disclosure relates generally to wireless communication systems and, more particularly, to streaming content to user equipment in wireless communication systems.

Description of the Related Art

Wireless communication systems support streaming services using either broadcast/multicast (MBMS) transmissions to groups of user equipment or dedicated unicast transmission to individual user equipment. Broadcast/multicast services provide the same packets at the same time to all the user equipment that are receiving the broadcast/multicast service. Thus, broadcast/multicast services are most suitable for programs such as live sporting events that are viewed by all users at precisely the same time. However, broadcast/multicast services do not permit users to view the same content at different times, e.g., two users cannot receive the same multicast program from the beginning at different times. Moreover, broadcast/multicast services do not support re-transmission of packets that were not successfully received by one or more user equipment. For example, broadcast/multicast services do not support hybrid automatic repeat request (HARQ) functionality. Radio resources are allocated to the broadcast/multicast services based on a worst-case scenario to ensure that the quality of the broadcast/multicast service is sufficiently high even at locations within the coverage area that have the lowest channel qualities. Broadcast/multicast services therefore tend to be very inefficient.

Unicast services provide a dedicated stream of packets to a single user equipment. Users may therefore start programs or downloads independently of any other users that may be receiving the programs or downloads using a different dedicated stream of packets provided by the unicast service. Unicasting is therefore typically used for streaming services such as pay-per-view streaming of movies or sporting events and downloading large files. Unicasting may be more efficient than broadcasting or multicasting because radio resources are allocated to unicast services based on the channel quality to the receiving user equipment. However, unicasting content may be inefficient and problematic in areas that include a large density of user equipment that are requesting access to the same content. For example, a large number of users in a conference room may want to download the same set of files during the same period of time. For another example, fans in a stadium watching a sporting event may request replays of exciting parts of the game at roughly the same time. In either case, unicasting packets from the same unicast service to a large number of users in the same area may require multiple concurrent streams that can generate congestion, which may lead to reduced quality of user experience, e.g., because of long download times or blocked access to the service.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for identifying multiple user equipment that receive the same unicast service. The method includes receiving, at a content adapter, a request from a first user equipment to receive a unicast service via a base station and determining that the base station is providing the unicast service to a second user equipment using a service identifier. The method also includes transmitting, from the content adapter, a signal instructing the base station to allocate the service identifier to the first user equipment for receiving the unicast service concurrently with the second user equipment.

In some embodiments, a method is provided for streaming unicast services to multiple user equipment. The method includes allocating, at a base station, a service identifier to a first user equipment in response to the first user equipment requesting a unicast service that the base station is already providing to a second user equipment using the service identifier. The method also includes transmitting, from the base station, content for the unicast service for reception by the first and second user equipment based on the service identifier.

In some embodiments, a method is provided for receiving unicast services at a user equipment using a shared service identifier. The method includes receiving, at a first user equipment, a service identifier of a first physical downlink control channel (PDCCH) for a unicast service and a temporary identifier of a second PDCCH and decoding the first PDCCH based on the service identifier and the second PDCCH based on the temporary identifier. The method also includes storing one or more first packets of the unicast service received on a first physical downlink shared channel (PDSCH) indicated by the first PDCCH and one or more second packets of the unicast service received on a second (PDSCH) indicated by the second PDCCH.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Network resources can be conserved while improving the quality of experience for users receiving unicast services by allocating the same unicast service identifier to a plurality of user equipment that request the unicast service at different times. In some embodiments, a content adaptation function maintains a table that identifies user equipment receiving the unicast services from different base stations. The content adaptation function may use the stored table to determine whether one or more first user equipment are already receiving the unicast service from a base station in response to a request from a second user equipment to receive the unicast service from the same base station. If so, the content adaptation function instructs the base station to allocate the unicast service identifier used by the first user equipment to the second user equipment so that the first and second user equipment share the same unicast service identifier. The second user equipment may therefore decode the same physical downlink control channel (PDCCH) scheduling information as the first user equipment and consequently may receive the same unicast service in the same physical resources of a physical downlink shared channel (PDSCH). In some embodiments, other dedicated resources of control channels or shared channels may be used to support packet retransmission, transmission of previous unicast service packets to a user equipment that join the shared unicast service at a later time, and cyclical transmission of unicast service packets. Some embodiments of base stations may cache unicast service packets for subsequent transmission and some embodiments of user equipment may buffer the shared unicast service packets to support packet reordering.

Figure 1:
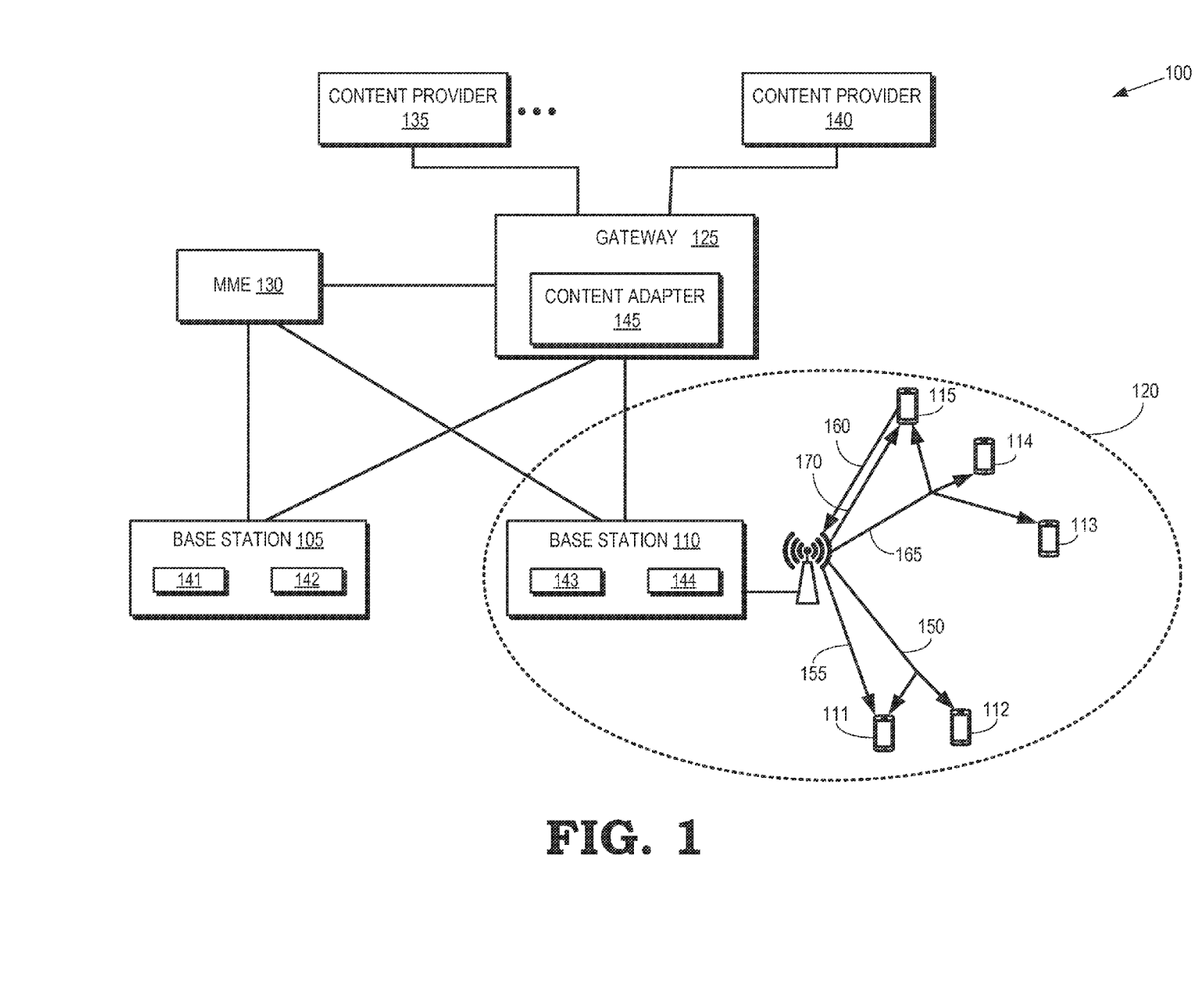
FIG. 1 is a block diagram of a wireless communication system according to some embodiments.

FIG. 1 is a block diagram of a wireless communication system 100 according to some embodiments. The wireless communication system 100 includes base stations 105, 110 that provide wireless connectivity within corresponding geographic areas such as cells or sectors. For example, the base station 110 provides wireless connectivity including assigning shared local service identifiers associated with the unicast service and dedicated temporary identifiers to user equipment 111, 112, 113, 114, 115 (collectively referred to as "the user equipment 111-115") within the cell 120. The base station 105 may also provide wireless connectivity to user equipment within a corresponding cell (not shown in FIG. 1 in the interest of clarity). Some embodiments of the base stations 105, 110 may provide wireless connectivity according to standards or protocols such as the Long Term Evolution (LTE) standards defined by the Third Generation Partnership Project (3GPP). However, the base stations 105, 110 (or other base stations not shown in FIG. 1) may provide wireless connectivity in the wireless communication system 100 according to other standards or protocols.

The base stations 105, 110 are connected to a gateway 125, which may be a serving gateway or a packet data network (PDN) gateway. Some embodiments of a serving gateway can route and forward user data packets and act as a mobility anchor for the user plane during handovers between base stations such as the base stations 105, 110. The serving gateway may terminate the downlink data path for user equipment that are in the idle mode and may trigger paging when downlink data arrives for the idle user equipment. The serving gateway may also manage and store contexts that include parameters to define the IP bearer service for user equipment. Some embodiments of a PDN gateway provide connectivity between user equipment and external packet data networks. The PDN gateway may perform policy enforcement, packet filtering for the user equipment, charging support, lawful interception, and packet screening. The PDN gateway may also be an anchor for mobility between 3GPP and non-3GPP technologies.

The base stations 105, 110 and the gateway 125 are connected to a mobility management entity (MME) 130. Some embodiments of the MME 130 are responsible for paging user equipment that are in the idle mode. The MME 130 participates in bearer activation/deactivation and is responsible for choosing a serving gateway at the initial attachment of the user equipment 111-115 to the wireless communication system 100. The MME 130 terminates non-access stratum (NAS) signaling for the user equipment 111-115. The MME 130 may be the termination point for ciphering/integrity protection for NAS signaling in the wireless communication system 100 and may provide control plane functions for mobility between different network types.

One or more content providers 135, 140 may provide content to the gateway 125 for distribution to one or more of the user equipment 111-115. Examples of content provided by the content providers 135, 140 may include live streaming of events such as sporting events, pay-per-view movies or programs, file downloads, group push-to-talk, and the like. The gateway 125 may provide the content to the base stations 105, 110 for transmission to one or more of the user equipment 111-115. Some embodiments of the base stations 105, 110 may store or cache the content received from the content providers 135, 140. For example, the base stations 105, 110 may store the received content in one or more caches 141, 142, 143, 144 (collectively referred to as "the caches 141-144").

The gateway 125 and the base stations 105, 110 may provide the content as a broadcast service, a multicast service, or a unicast service. Broadcast and multicast services both use point-to-multipoint transmissions to send packets from a single point (such as the base station 110) to multiple destination points (such as the user equipment 111-115). Broadcast services transmit packets to all of the devices (such as the user equipment 111-115) within a network and multicast services transmit packets to a group of devices (such as the user equipment 111-115) that are identified by a group address. In contrast, unicast services use point-to-point transmissions to send packets from a single point (such as the base station 110) to a single destination point (such as the user equipment 111). Packets transmitted to a user equipment as part of a unicast service are identified by an address or identifier assigned to the destination user equipment.

As discussed herein, resources of the wireless communication system 100 can be conserved while improving the quality of experience for users receiving unicast services by allocating the same local unicast service identifier to user equipment that request the unicast service from the same base station at different times. Some embodiments of the gateway 125 may therefore include a content adapter 145 that can keep track of unicast services provided by the base stations 105, 110 and instruct the base stations 105, 110 to use a shared local unicast service identifier for transmission of on-going unicast services to multiple user equipment. For example, the content adapter 145 may receive a request from user equipment 111 to receive a unicast service via the base station 110. The content adapter 145 may determine that the base station 110 is already providing the unicast service to user equipment 112 using a global service content identifier for the unicast service, e.g., by referencing a table that stores the global service content identifier, a type of the unicast service, an identifier of the base station 110, and an identifier of the user equipment 112. The content adapter 145 may then transmit a signal instructing the base station 110 to allocate the local service identifier to the user equipment 111 for receiving the unicast service concurrently with the user equipment 112, as indicated by the double-headed branching arrow 150.

As used herein, the term "global service content identifier" refers to an identifier that is maintained by the content adapter 145 and uniquely identifies the unicast service content being provided by one or more content providers 135, 140 and delivered to one or more of the base stations 105, 110 (or other base stations associated with the content adapter 145). The service content identifier may be constructed as the combination of the service content provider (server) address and a content identifier from each of the content provider (server). As used herein, the term "local service identifier" refers to an identifier that is maintained by one of the base stations 105, 110 and used to identify a unicast service provided to one or more user equipment 111-115. Some embodiments of the local service identifier may utilize the same format as a Radio Network Temporary Identifier (RNTI) defined by the LTE standards. The local service identifier may be used to distinguish between a smaller number of unicast services (e.g., only those unicast services that are concurrently provided by the base station during a given period of time) than the number of unicast services that are distinguished by the global service content identifier (e.g., all the unicast service content of interest provided by all the content providers 135, 140 associated with base stations 105, 110 in the wireless communication system 100). Thus, the local service identifier may be shorter than the global service content identifier, e.g., the local service identifier may have fewer digits or fewer bits than the global service content identifier. The local service identifier may be derived from the global service content identifier (e.g., by selecting a subset of the bits or digits of the global service content identifier or applying a function such as a hashing function to the global service content identifier) or the local service identifier may be an independently derived identifier that is mapped to the global service content identifier of an activated service content that is currently being provided to the base station. The local service identifier may be released when the service is completed or the user equipment is moved to another cell. Local service identifiers may also be referred to as per-cell identifiers.

In response to receiving the instruction from the content adapter 145, the base station 110 may transmit packets of content for the unicast service to the user equipment 111, 112 using the shared local service identifier. Some embodiments of the base station 110 allocate the local service identifier (used to identify the ongoing unicast service to the user equipment 112) to the user equipment 111. The base station 110 then transmits the packets of content for reception by the user equipment 111, 112. For example, the base station 110 may transmit scheduling information on a physical downlink control channel (PDCCH) using the local service identifier. The scheduling information identifies resources of a first physical downlink shared channel (PDSCH), such as the physical resource blocks of the first PDSCH allocated to the unicast service. The allocated physical resource block may be referred to as a unicast service channel or a unicast service PDSCH. The base station 110 may scramble the scheduling information (such as physical downlink control channel (PDCCH) scheduling information) for the unicast service using the local service identifier. Thus, only the user equipment 111, 112 that have been allocated the shared local service identifier can unscramble and decode the scheduling information for the unicast service.

Some embodiments of the base station 110 may also provide packets of content for the unicast service using dedicated channels that are allocated separately to the user equipment 111, 112 and identified by different identifiers. For example, the user equipment 111 may be allocated a PDSCH channel 155 that is identified by a local temporary identifier that is different than the shared local service identifier. Some embodiments of the base station 110 may use the additional dedicated channels to retransmit unsuccessfully received packets. For example, the user equipment 115 may provide a retransmission request 160 for a packet that was unsuccessfully received in a shared unicast transmission (indicated by the triple-headed branching arrow 165) to the user equipment 113-115. The base station 110 may then use an additional PDSCH channel 170 identified by a local temporary identifier dedicated to the user equipment 115 in the serving cell 120 to retransmit the unsuccessfully received packet to the user equipment 115. Some embodiments of the base station 110 may use the additional dedicated channel to transmit packets of the unicast service content to the user equipment 111 that have already been transmitted to the user equipment 112, as discussed herein. Some embodiments of the base station 110 may also cyclically transmit packets of the unicast service content over a predetermined time interval so that the user equipment 111, 112 can receive all the packets of the unicast service content by monitoring the unicast service PDSCH for the predetermined time interval, regardless of when the user equipment 111, 112 began monitoring the unicast service PDSCH, as discussed herein.

Figure 2:
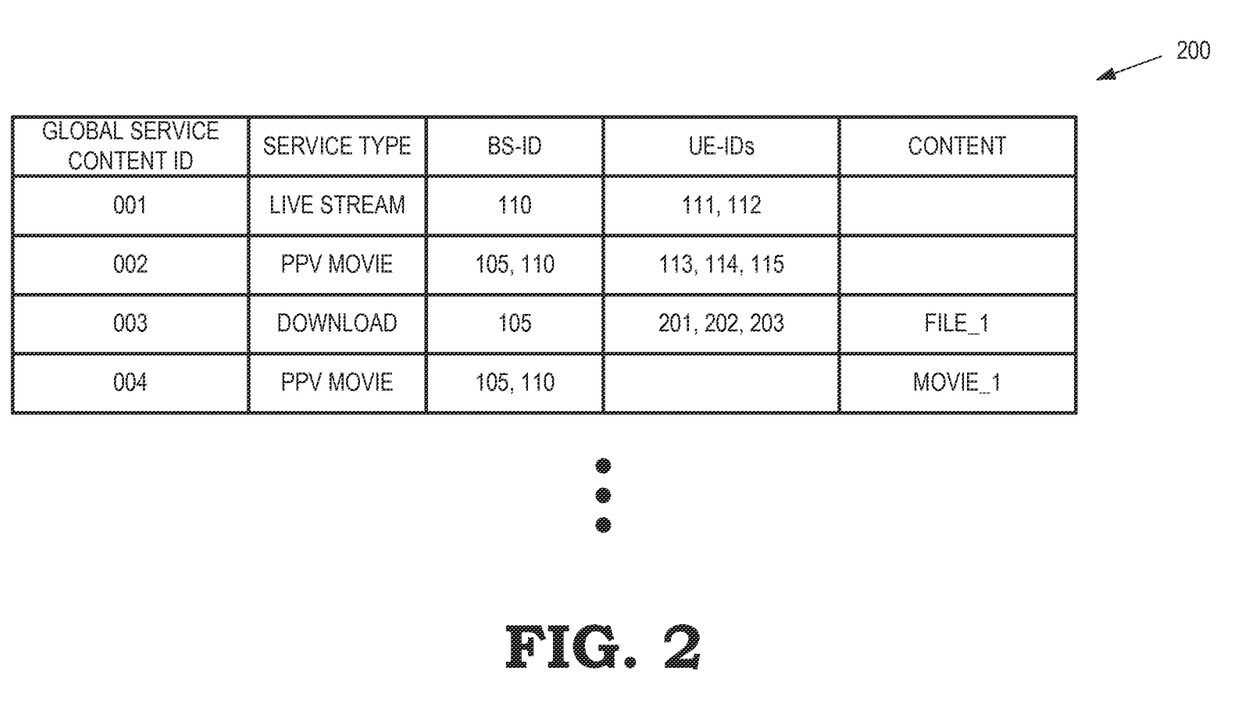
FIG. 2 is a diagram of a table for identifying unicast services provided by different base stations according to some embodiments.

FIG. 2 is a diagram of a table 200 for identifying unicast services provided by different base stations according to some embodiments. The table 200 may be stored and maintained by some embodiments of the content adapter 145 shown in FIG. 1. The illustrated embodiment of the table 200 includes columns for storing information indicating a global service content identifier for unicast service, a service type of the unicast service, a base station identifier to indicate the base station that is providing the unicast service, identifiers of user equipment that are receiving the ongoing unicast service, and unicast service content that is to be stored or cached by the corresponding base station. As discussed herein, base stations (or the content adapter) may derive a local service identifier that is associated with the global service content identifier. For example, a global service content identifier of 001 may be used to indicate a unicast service that has a service type of "Live Stream" to indicate that the unicast service is providing streaming of a live event such as a sporting event or a concert. The unicast service 001 is provided by a base station indicated by the reference 110, such as the base station 110 shown in FIG. 1, and is provided to user equipment indicated by the identifiers 111, 112, such as the user equipment 111, 112 shown in FIG. 1. The base stations 105, 110 are providing unicast service 002 (a pay-per-view movie service type) to user equipment 113-115 as indicated by the corresponding row in the table 200. The base station 105 is providing the unicast service 003 (a file download service type) to user equipment indicated by the identifiers 201, 202, 203, as indicated by the corresponding row in the table 200.

Some embodiments of the content adapter collect statistics associated with the unicast service or the contents provided by the unicast service. For example, if the value of a metric determined by the statistics exceeds an associated threshold indicating that the content for the unicast service has been requested by a corresponding number of users, at a corresponding rate, or by a corresponding density of users, the content adapter may instruct one or more base stations providing the unicast service to store the receive content for a predetermined time interval. Some embodiments of the base station therefore provide stored contents of the unicast service in response to subsequent requests from user equipment. Thus, the base station may not request the content from the content provider or application server. For example, the content adapter requested that the base stations 105, 110 store content (MOVIE_1) associated with unicast service 004 of service type PPV MOVIE although currently no user equipment are using the unicast service 004. For another example, the content adapter requested that the base station 105 store content (FILE_1) associated with unicast service 003 of service type DOWNLOAD so that subsequent user equipment can receive the unicast service 003 directly from the base station (without providing a request to the content provider or application server) regardless of whether any other user equipment are using the unicast service at the time of the subsequent request.

Figure 3:
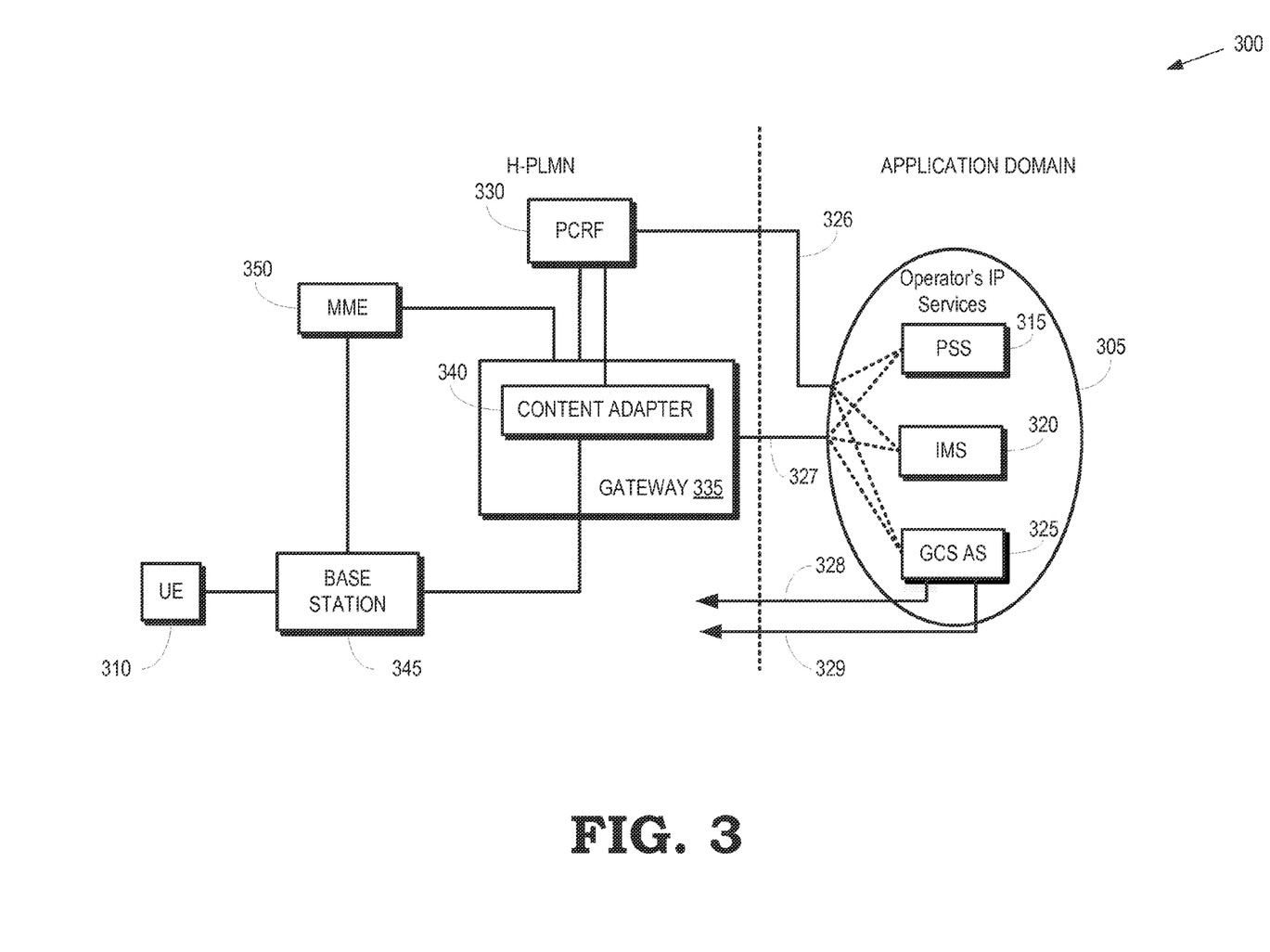
FIG. 3 is a block diagram of a reference architecture for a wireless communication system that supports unicast services according to some embodiments.

FIG. 3 is a block diagram of a reference architecture 300 for a wireless communication system that supports unicast services according to some embodiments. The reference architecture 300 may be used as the reference architecture for some embodiments of the wireless communication system 100 shown in FIG. 1. The reference architecture 300 is used to provide Internet Protocol (IP) services from an application server 305 in an application domain to one or more user equipment 310 in a home public land mobile network (H-PLMN) domain. Examples of the IP services provided by the application server 305 include unicast services or multicast services provided by entities such as a packet-switched streaming service (PSS 315) for providing unicast applications, an IP multimedia subsystem (IMS) 320 for unicasting multimedia content such as voice or video, and a group communication system application server (GCS-AS) 325 for unicasting messages to groups of user equipment 310. Unicast services may be provided over the interfaces 326, 327 and the multicast services may be provided over the interfaces 328, 329.

The reference architecture 300 includes a policy and charging rules function (PCRF) 330 that is used to establish and enforce policy and charging rules so that user equipment 310 are properly charged for any services accessed via the reference architecture 300. Some embodiments of the PCRF 330 may aggregate information in real time, create rules, and automatically make policy decisions for subscribers active in the wireless communication system. The PCRF 330 may be implemented as a stand-alone entity or may be integrated with other entities such as billing platforms, rating platforms, charging platforms, subscriber databases, and the like. Some embodiments of the PCRF 330 may receive information characterizing services such as a unicast service being provided to the user equipment 310 over the interface 326. This information may be used to bill or charge the user equipment 310 for the unicast service.

A gateway 335 implements a content adapter 340 that maintains a table or database including information identifying ongoing unicast services provided by a base station 345. The gateway 305 and the content adapter 340 may be used to implement some embodiments of the gateway 125 and the content adapter 145 shown in FIG. 1 and the table may be implemented using embodiments of the table 200 shown in FIG. 2. The base station 345 may be an evolved Universal Mobile Telecommunication System (UMTS) terrestrial radio access network (E-UTRAN) and may be used to implement some embodiments of the base stations 105, 110 shown in FIG. 1. As discussed herein, the content adapter 340 may provide signaling to instruct the base station 345 to use a shared local unicast service identifier for transmission of unicast services to user equipment 310 when the base station 345 is already providing the unicast service to one or other user equipment. The gateway 335 and the base station 345 are connected to a MME 350 over corresponding interfaces. The MME 350 may be used to implement some embodiments of the MME 130 shown in FIG. 1.

The content adapter 340 collects and stores information identifying unicast services provided to user equipment 310. The information may include a global service content identifier (which may also be referred to as a global content identifier of the content of the unicast service) and a type of the service, such as live streaming, pay-per-view, file download, group push-to-talk, and the like. The global service content identifier (in conjunction with the service type in some embodiments) may be used to uniquely identify the service content being provided to the user equipment 310 by the base station 345. Some embodiments of the content adapter 340 collect and store the global service content identifier, the service type, and associated context information when the unicast service is initially registered by the user equipment 310. The content adapter 340 may also function at the application layer to identify the applications that have been requested by the user equipment 310. The content adapter 340 also stores identifiers of the user equipment 310 and the base station 345 that are providing the unicast service. Whenever the user equipment 310 is handed over to a new cell, an identifier of the new serving base station such as the IP address of the base station may be updated to the content adapter 340.

In response to receiving a request from the user equipment 310 to initiate the unicast service via the base station 345, the content adapter 340 may determine whether the requested unicast service is ongoing and being provided by the base station 345 to another user equipment or already being cached at the base station. If not, the content adapter 340 may transmit a request to the IP services application server 305 to initiate a new unicast service to the user equipment 310. The content adapter 340 may then store information identifying the unicast service being provided to the user equipment 310 by the base station 345. If the requested unicast service is ongoing from the base station 345, the content adapter 340 does not transmit a request to the IP services 305. Instead, the content adapter 340 instructs the base station 345 to establish a shared unicast service by allocating the same local unicast service identifier to the user equipment 310 as was previously allocated to the other user equipment for the unicast service. The content adapter 340 may also notify the PCRF 330 and the application server 305 that the user equipment 310 is receiving the shared unicast service.

Some embodiments of the content adapter 340 collect statistics that characterize the unicast service provided to the user equipment 310. For example, the content adapter 340 may collect information indicating the number of requests for the unicast service during a given time interval or a rate of requests for the unicast service. The number or rate of requests may be used as a metric for determining how often the unicast service or associated content is requested. Some embodiments of the content adapter 340 may instruct the base station 345 to store or cache content associated with the unicast service for a predetermined time interval if the number or rate of requests are above corresponding thresholds. The content adapter 340 may also measure a density of user equipment 310 associated with the coverage area of the base station 345 and the density may also be used to decide whether to instruct the base station 345 to store or cache content. If the requested unicast service is not ongoing, but previously provided content of the unicast service is cached at the base station 345, the content adapter 340 may not transmit a request to the IP services 305. Instead, the content adapter 340 instructs the base station 345 to establish a unicast service for the user equipment 310 using the cached content. The content adapter 340 may also notify the PCRF 330 and the application server 305 that the user equipment 310 is receiving the unicast service.

The base station 345 may be configured to provide a shared unicast service to the user equipment 310 (and other user equipment not shown in FIG. 3) on the basis of a shared local service identifier. The base station 345 may provide the shared unicast service in response to signaling from the content adapter 345 instructing the base station 345 to allocate the local service identifier already in use by the other user equipment to the user equipment 310. The base station 345 may therefore add the user equipment 310 to a pool or group of users including the other user equipment. Some embodiments of the base station 345 broadcast a separate control channel (such as a PDCCH) including scheduling information for each user equipment in the pool. The scheduling information sent on the different control channels may indicate the same physical resource blocks of a shared channel (such as a PDSCH) so that the different user equipment are able to decode the same content such as packets provided by the unicast service. This approach results in duplicated control channel transmissions for the different user equipment in the pool, which may conflict with the goal of conserving control channel resources.

Some embodiments of the base station 345 assign a shared local service identifier to all the user equipment 310 in the pool of users. For example, in response to user equipment requesting an ongoing unicast service, the user equipment may be assigned the local service identifier that is currently being used to identify the ongoing unicast service being provided to other user equipment. The local service identifier may be an identifier similar to the per-Cell Radio Network Temporary Identifier (C-RNTI) defined by the LTE standards. It may be defined as a Multicast RNTI (M-RNTI). The cyclic redundancy check (CRC) for payloads of packets including the scheduling information transmitted on the control channel may be scrambled by the local service identifier. Thus, the user equipment in the pool that have been assigned the same local service identifier (e.g., the same M-RNTI) can use the local service identifier to decode the control channel and receive the same scheduling information. The user equipment in the pool may therefore decode the same resources of the shared data channel (e.g., physical resource blocks of the PDSCH) used by the unicast service. Some embodiments of the base station 345 also assign a unique local temporary identifier such as a C-RNTI to each user equipment in the pool. The local temporary identifiers may be used to separately identify messages transmitted to the different user equipment on other channels (e.g., other PDCCH or PDSCH that are allocated separately to the different user equipment) to support other concurrent unicast services, retransmission protocols such as Hybrid Automatic Repeat Request (HARQ), and the like.

The content adapter 340 may instruct the base station 345 to store or cache contents received as part of the unicast service. For example, the content adapter 340 may instruct the base station 345 to store or cache unicast service packets received over the shared data channel for a predetermined time interval. The base station 345 may then store or cache the unicast service packets for the predetermined time interval, e.g., until a pre-set timer expires. The stored or cached contents may be identified by the service type and the local service identifier. Some embodiments of the base station 345 may schedule and transmit stored or cached contents to one or more user equipment 310 in response to an instruction from the content adapter 340. The stored or cached contents may be broadcast, multicast, or unicast to the user equipment. For example, the content adapter 340 may instruct the base station 345 to broadcast or multicast the content when a number of users requesting the content exceeds a threshold. The content adapter 340 may instruct the base station 345 to unicast the content when the number of users requesting the content is below the threshold.

Some embodiments of the base station 345 schedule transmissions of the packets for the unicast service based on feedback received from the different user equipment 310 in the pool. For example, the base station 345 may allocate resources such as power based upon the channel quality information received from the different user equipment 310. The base station 345 may allocate the resources so that the user equipment 310 with the worst channel conditions can receive the unicast service. Some embodiments of the base station 345 may treat multiple user equipment in the same pool differently. For example, the base station 345 may employ beamforming to improve the coverage for user equipment 310 at different locations. The base station 345 may prioritize scheduling of the unicast service packets when more than one user equipment 310 is receiving the unicast service using a shared local service identifier. For example, a unicast service that is shared by three user equipment 310 may be prioritized over a unicast service that is used by a single user equipment 310. Some embodiments of the base station 345 implement semi-persistent scheduling so that the scheduling information transmitted on the control channel in one segment is used to decode packets received on the shared data channel in more than one subsequent segment.

Retransmission of packets may be supported by the base station 345. Some embodiments of the base station 345 may receive retransmission requests from user equipment 310 in response to the user equipment 310 failing to decode one or more packets of content of the unicast service. The base station 345 may retransmit the requested packet on a different data channel than the shared data channel used for the unicast service. For example, the base station 345 may schedule the retransmission using a control channel identified by a local temporary identifier uniquely assigned to the user equipment 310. The base station 345 may then retransmit the packet in the scheduled resources of the data channel allocated to the user equipment 310. Some embodiments of the base station 345 may support cyclical retransmission of sets of packets of content of the unicast service based on the service type. For example, the unicast service may be used for downloading a large file. The base station 345 may cyclically transmit the contents of the file so that user equipment 310 can download the entire file based on packets received over a time interval required to transmit the contents of the file, regardless of when the user equipment begins downloading the file.

User equipment 310 may be handed off to the base station 345 or may be handed off from the base station 345 to another base station. During handoff, the target cell or base station may ensure continuity of the unicast service being received by the user equipment 310. For example, if the same unicast service is ongoing in the target cell, the target cell may assign the shared local service identifier used for the ongoing unicast service to the user equipment 310 when it hands off into the target cell. Otherwise, if the unicast service is not ongoing in the target cell, the target cell may initiate the unicast service to preserve continuity of the unicast service to the user equipment 310 when it hands off into the target cell.

The gateway 335 may be used to relay the unicast service sharing instructions from the content adapter 340 to the base station 345, e.g., by signaling transmitted via the MME 350. The gateway 335 may also maintain a database identifying the serving base station 345 for the user equipment 310. The database may be updated in response to the user equipment 310 handing over to a new base station. Some embodiments of the interface between the gateway 335 and the MME 350 support the signaling of content-based instructions and reporting of events related to providing the shared unicast service.

Some embodiments of the user equipment 310 are configured to concurrently decode multiple control channels based on different local temporary identifiers. For example, the user equipment 310 may be able to simultaneously or concurrently decode a PDCCH used for the shared unicast service based on a local service identifier that is shared with one or other user equipment and a PDCCH used for another unicast service based on an additional local temporary identifier that is uniquely assigned to the user equipment 310. The user equipment 310 may also include storage such as one or more buffers to store packets received concurrently over different data channels, such as shared unicast service packets received over a first data channel and packets received over a second data channel. The packets received over the second data channel may include retransmissions of unsuccessfully received packets or "catch-up" packets including content of the shared unicast service that was previously transmitted to other user equipment. The buffered packets may then be reordered to reflect the intended order of the packets in the shared unicast service, e.g., based on a sequence of packet numbers.

The user equipment 310 may transmit a negative acknowledgment (NAK) in response to failing to successfully decode one or more packets of the unicast service. The NAK may be transmitted on an uplink control channel associated with the user equipment 310.

Figure 4:
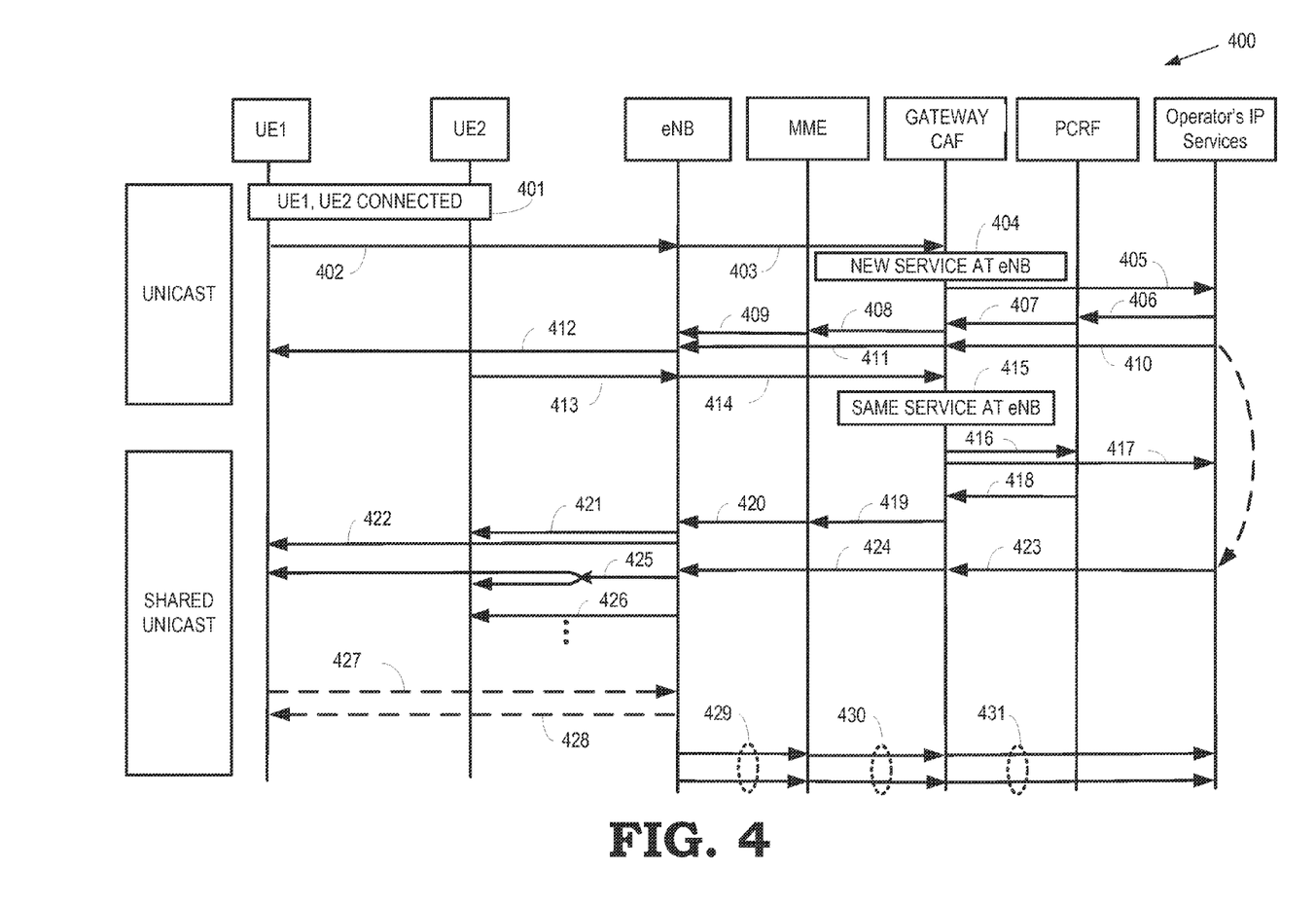
FIG. 4 is a flow diagram of a method of providing a unicast service and a shared unicast service according to some embodiments.

FIG. 4 is a flow diagram of a method 400 of providing a unicast service and a shared unicast service according to some embodiments. The method 400 illustrates signaling flows between first and second user equipment (UE1, UE2), a base station (eNB), an MME, a gateway including a content adapter function (CAF), a PCRF, and an operator's IP services provided from an application server in an application domain. Thus, the method 400 may be implemented in some embodiments of the wireless communication system 100 shown in FIG. 1 or the reference architecture 300 shown in FIG. 3. Initially, at block 401, the user equipment are in a connected mode such as a radio resource control (RRC) connected mode with the same serving base station. The first user equipment transmits (at 402) a request for a unicast service to the base station, which forwards (at 403) the request to the gateway and the content adapter function. At block 404, the content adapter function determines that the first user equipment is the first to request the unicast service from the base station. The content adapter function stores identifiers of the user equipment and the base station, a global service content identifier of the unicast service, and in some cases the type of the unicast service, e.g., in a data structure such as the table 200 shown in FIG. 2. The content adapter also transmits (at 405) a request to the application server to deliver the unicast service to the base station.

The application server provides (at 406) information indicating the unicast service, the global service content identifier, and other context information to the PCRF, which transmits (at 407) a quality of service indicator and a charging policy to the gateway. The gateway notifies (at 408) the MME that the new unicast service has been initiated and the MME notifies (at 409) the base station that the unicast service has been initiated. The application server also begins transmitting (at 410) packets of content for the unicast service to the gateway, which forwards (at 411) the packets to the base station. At 412, the base station provides the packets to the first user equipment, e.g., by scheduling the packets using signaling transmitted over a control channel identified by a local service identifier and transmitting the packets over scheduled resource blocks of a shared data channel. Some embodiments of the base station may also store or cache the unicast service content for a predetermined time, as discussed herein. This phase of the method 400 may be referred to as the "unicast" phase since a single user equipment is receiving the unicast service.

The second user equipment transmits (at 413) a request to the base station to receive the same unicast service. The base station forwards (at 414) the request to the gateway and the content adapter function. At block 415, the content adapter function determines that the second user equipment is requesting the same unicast service from the base station as the first user equipment. For example, the content adapter function may use the global content identifier of the unicast service to identify the same unicast service content and associated base station using information stored in a table such as the table 200 shown in FIG. 2. The content adapter function therefore bypasses transmitting a request for the unicast service to the application server. Instead, the content adapter function initiates a "shared unicast" service phase.

At 416, the content adapter function sends a notification indicating the unicast service, the global service content identifier, and other context information to the PCRF. At 417, the content adapter function may also notify the application server that the content adapter function has initiated the shared unicast service. Some embodiments of the application server may therefore provide content, such as previously transmitted content for the unicast service, in response to the notification. The PCRF transmits (at 418) a quality of service indicator and a charging policy to the gateway. The gateway notifies (at 419) the MME that the new unicast service has been initiated and the MME notifies (at 420) the base station that the shared unicast service has been initiated.

At 421 and 422, the base station transmits a shared unicast mode-enabling command to the first user equipment and the second user equipment. The shared unicast mode-enabling commands 421, 422 include information indicating the unicast service type, the shared local service identifier, and context information including a security key for decryption. Examples of the unicast service type include a real time streaming broadcast such as live sporting event, on-demand streaming services such as pay-per-view movies that the user begins watching immediately after the request has been sent, file downloading in which the file is read or watched only after the entire file is downloaded, and interactive group multicast such as group push-to-talk. In some embodiments, the shared unicast mode-enabling commands 421, 422 may indicate that the shared unicast service is to be delivered in a semi-persistent mode. In the shared unicast phase, the first and second user equipment use the shared local service identifier to decode a shared control channel such as a shared PDCCH for the unicast service. The first and second user equipment may perform decoding and reordering of decoded packets based on the service type. Some embodiments of the shared unicast mode-enabling commands 421, 422 may also include additional local temporary identifiers that are uniquely assigned to each of the first and second user equipment.

The application server continues to provide (at 423) content for the unicast service to the gateway, which forwards (at 424) the content to the base station. The base station transmits packets of content for the shared unicast service at 425. For example, the base station may transmit scheduling information for the packets over a control channel that is scrambled using the shared local service identifier. The first and second user equipment may then decode the control channel based on the shared local service identifier and use the scheduling information to decode the physical resource blocks of a shared data channel used to transmit packets of content of the shared unicast service. As discussed herein, some embodiments of the base station may also store or cache the received content for the unicast service.

The second user equipment may not have received packets of the content that were previously transmitted to the first user equipment in the unicast phase. The base station may therefore transmit (at 426) the previously transmitted packets to the second user equipment using an additional data channel. For example, the base station may transmit scheduling information for the additional data channel to the second user equipment using an additional control channel that is scrambled based on the unique local temporary identifier for the second user equipment. The second user equipment may then decode the additional control channel based on its unique local temporary identifier and use the scheduling information to decode the physical resource blocks of the additional data channel used to transmit the previously transmitted packets of content of the shared unicast service. A buffer in the second user equipment may be used to store the packets received at 425 and 426 so that the packets can be reordered.

The first and second user equipment may independently transmit NAK messages in the event that either is unable to decode one or more packets of the content of the unicast service. For example, at 427, the first user equipment transmits a NAK to indicate that the first user equipment failed to decode a packet. At 428, the base station retransmits the packet to the first user equipment. For example, the base station may transmit scheduling information for an additional data channel to the first user equipment using an additional control channel that is scrambled based on the unique local temporary identifier for the first user equipment. The first user equipment may then decode the additional control channel based on its unique local temporary identifier and use the scheduling information to decode the physical resource blocks of the additional data channel used to retransmit the packet. A buffer in the first user equipment may be used to store the retransmitted packet for subsequent reordering.

When the shared unicast service has completed, the base station transmits (at 429) a control plane notification to the MME, which forwards (at 430) the notification to the gateway and content adapter function. A notification that the unicast service has completed may then be transmitted (at 431) from the gateway/content adapter function to the application server. In some embodiments, separate notifications may be transmitted for the first and second user equipment, as indicated by the multiple arrows 429, 430, 431.

Figure 5:
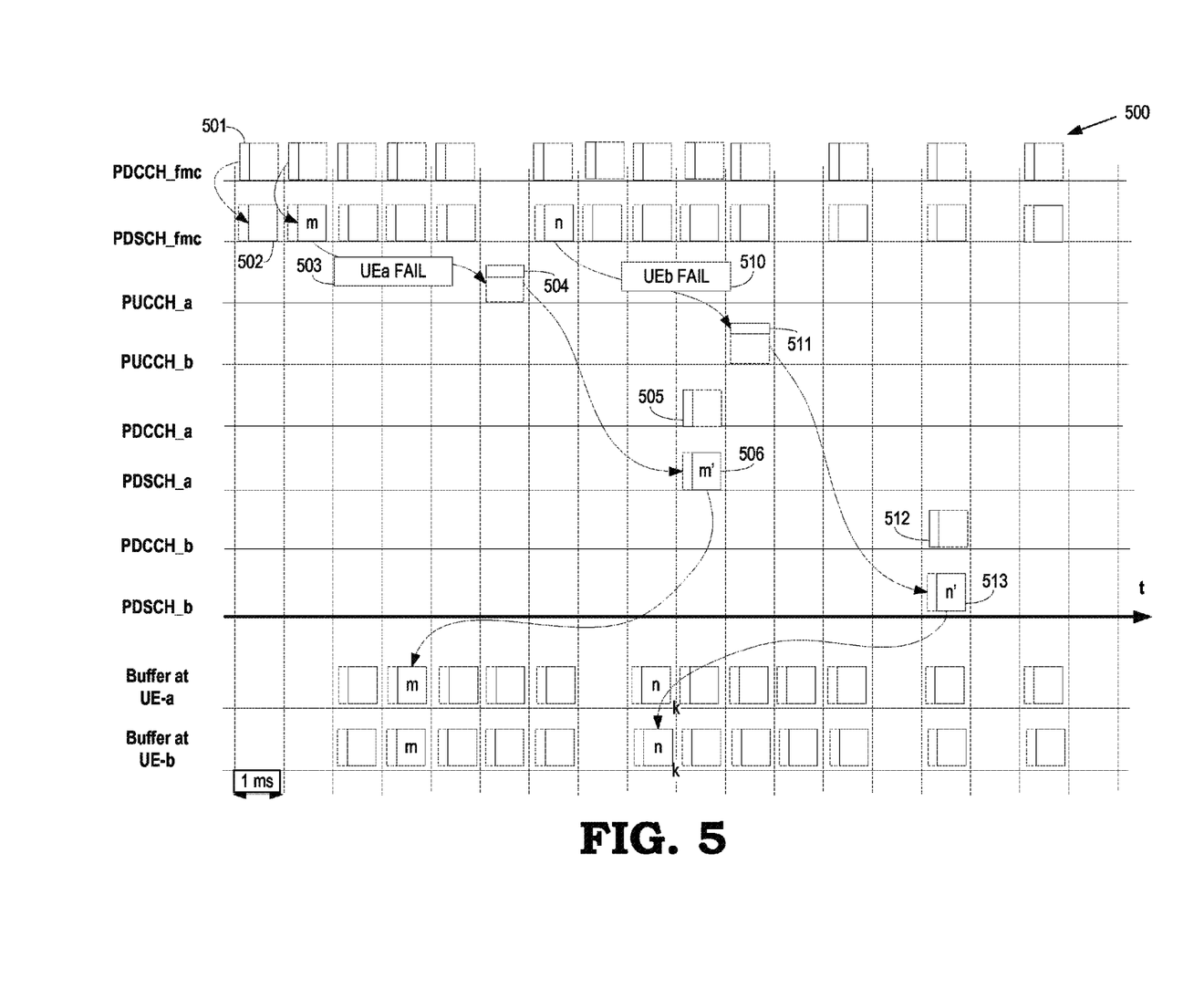
FIG. 5 is a timing diagram showing packet transmissions for a shared unicast service and packet retransmissions according to some embodiments.

FIG. 5 is a timing diagram 500 showing packet transmissions for a shared unicast service and packet retransmissions according to some embodiments. The timing diagram 500 may be implemented in some embodiments of the wireless communication system 100 shown in FIG. 1 or the reference architecture 300 shown in FIG. 3. The horizontal axis indicates time increasing from left to right. Channels and buffers are indicated in the vertical direction. In particular, FIG. 5 illustrates information transmitted by a base station on a shared unicast service control channel (PDCCH_fmc) associated with a shared local service identifier for the first and second user equipment, a shared unicast service data channel (PDSCH_fmc), an uplink control channel for a first user equipment (PUCCH_a), an uplink control channel for a second user equipment (PUCCH_b), a downlink control channel for the first user equipment (PDCCH_a) associated with a first local temporary identifier allocated to the first user equipment, a downlink data channel for the first user equipment (PDSCH_a), a downlink control channel for the second user equipment (PDCCH_b) associated with a second local temporary identifier allocated to the second user equipment, and a downlink data channel for the second user equipment (PDCCH_b). FIG. 5 also depicts the contents of a buffer at the first user equipment (UE_a) and a buffer at the second user equipment (UE_b). The vertical dashed lines indicate Radio Link Control (RLC) layer segment boundaries.

The base station transmits the scheduling information for the shared unicast service using the shared local service identifier in a portion 501 (only one indicated by a reference numeral in the interest of clarity) of segments of the shared unicast service control channel. Packets of the unicast service content are then transmitted in a portion 502 (only one indicated by a reference numeral in the interest of clarity) of segments of the shared unicast service data channel. The first and second user equipment successfully decode the packets in the portion 502 and may buffer this information in the corresponding buffer entries.

In the illustrated embodiment, the first user equipment fails (at 503) to decode the packets of content in the segment m and therefore transmits a retransmission request 504 (such as a NAK) on its dedicated uplink control channel. The base station receives the retransmission request 504 and, in response, schedules the retransmission by transmitting scheduling information 505 on the dedicated downlink control channel for the first user equipment using the first local temporary identifier. The base station then retransmits the segment m' in scheduled resources 506 of the dedicated downlink data channel for the first user equipment. The first user equipment successfully decodes the retransmitted content in the segment m' and stores the content in its buffer. Timing for decoding (or blindly decoding) the retransmitted content may be determined by embodiments of the retransmission scheme. The first user equipment may then reorder the packets so that the retransmitted content is in its intended location in the packet stream. For example, content in each of the segments may be associated with a segment number that is used to reorder the segments in the order indicated by the segment numbers.

In the illustrated embodiment, the second user equipment fails (at 510) to decode the packets of content in the segment n and therefore transmits a retransmission request 511 (such as a NAK) on its dedicated uplink control channel. The base station receives the retransmission request 511 and, in response, schedules the retransmission by transmitting scheduling information 512 on the dedicated downlink control channel for the second user equipment using the second local temporary identifier. The base station then retransmits the segment n' in scheduled resources 513 of the dedicated downlink data channel for the second user equipment. The second user equipment successfully decodes the retransmitted content in the segment n' and stores the content in its buffer. The second user equipment may then reorder the packets so that the retransmitted content is in its intended location in the packet stream. For example, content in each of the segments may be associated with a segment number that is used to reorder the segments in the order indicated by the segment numbers.

Figure 6:
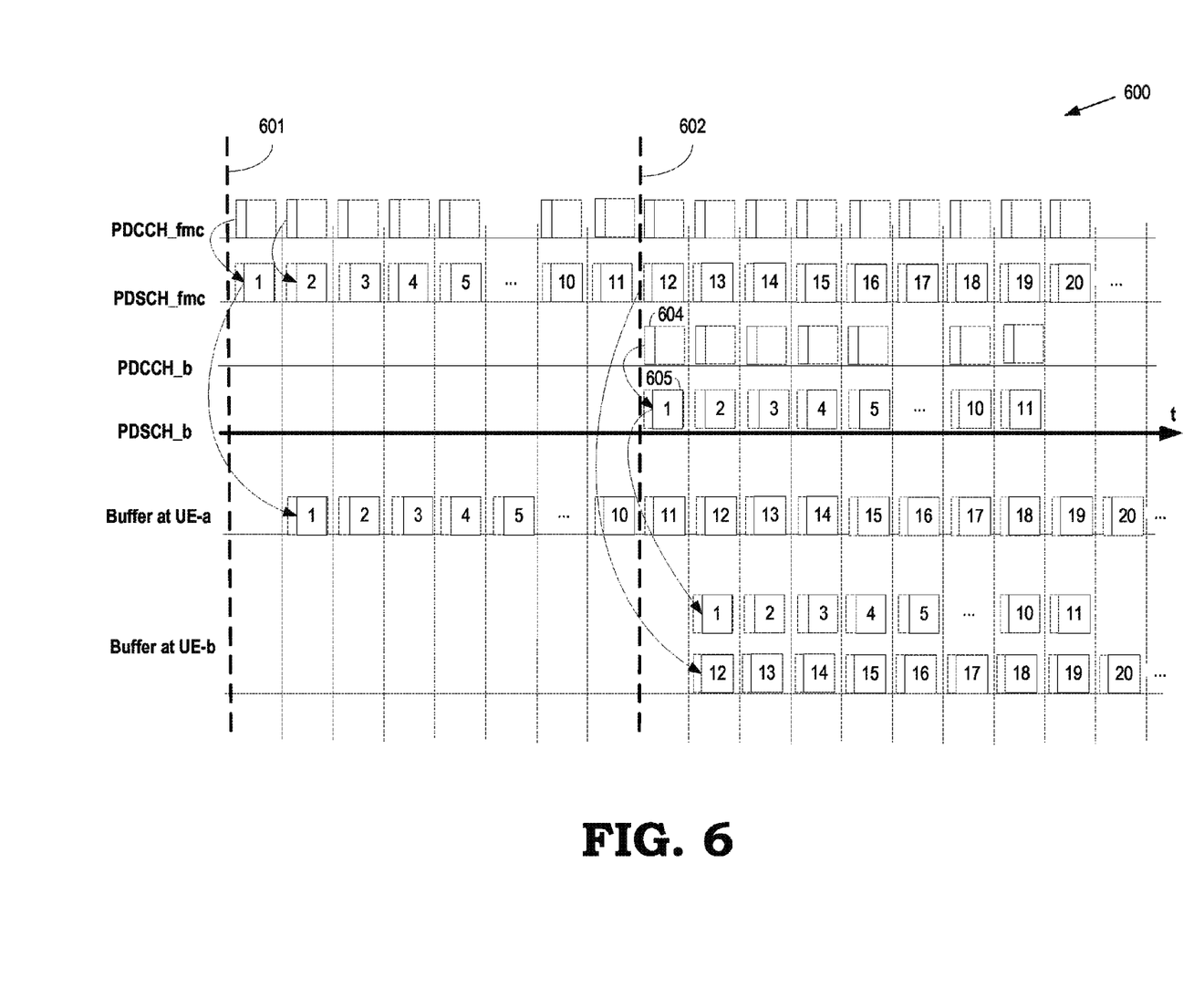
FIG. 6 is a timing diagram showing packet transmissions for a shared unicast service and transmission of "catch-up" packets according to some embodiments.

FIG. 6 is a timing diagram 600 showing packet transmissions for a shared unicast service and transmission of "catch-up" packets according to some embodiments. The transmission style is determined by the base station based on the service type information from the instruction from the content adapter. The service type in this case, for example, is a PPV movie. The timing diagram 600 may be implemented in some embodiments of the wireless communication system 100 shown in FIG. 1 or the reference architecture 300 shown in FIG. 3. The horizontal axis indicates time increasing from left to right. Channels and buffers are indicated in the vertical direction. In particular, FIG. 6 illustrates information transmitted by a base station on a shared unicast service control channel (PDCCH_fmc) associated with a shared service identifier for first and second user equipment, a shared unicast service data channel (PDSCH_fmc), a downlink control channel for the second user equipment (PDCCH_b) associated with a second temporary identifier allocated to the second user equipment, and a downlink data channel for the second user equipment (PDSCH_b). FIG. 6 also depicts the contents of a buffer at the first user equipment (UE_a) and a buffer at the second user equipment (UE_b). The vertical dashed lines indicate RLC layer segment boundaries.

The base station begins providing the unicast service to the first user equipment at time 601. Content received over the shared unicast service data channel is order based on RLC layer segmentation numbers. The first user equipment receives the RLC segments 1, 2, . . . , 11 over the shared unicast service data channel and stores the received RLC segments 1, 2, . . . , 11 in its buffer. The second user equipment subsequently requests the ongoing unicast service from the base station, which assigns the shared local service identifier to the second user equipment so that the second user equipment can decode the shared unicast service control channel and receive content transmitted over the shared unicast service data channel. The second user equipment begins receiving content at the time 602 and so the second user equipment begins receiving content at the segment 12.

A content adapter associated with the base station identifies the unicast service as an on-demand streaming service, e.g., based on information indicating the service type that is stored in a table at the content adapter. The content adapter may therefore instruct the base station to provide "catch-up" packets that include content that was previously transmitted to the first user equipment over the shared unicast service data channel, but which was not received by the second base station because it did not request the unicast service until the time 602. The base station schedules transmission of the catch-up packets to the second user equipment and transmits scheduling information 603 to the second user equipment over the dedicated downlink control channel for the second user equipment. The base station then transmits the catch-up packets in scheduled resources 604 of the segment. In the illustrated embodiment, the catch-up packets are transmitted on the dedicated downlink data channel simultaneously or concurrently with packets of the unicast service content transmitted over the shared unicast service data channel.

The second user equipment concurrently decodes the content received over the shared unicast service data channel and the dedicated downlink data channel. The decoded content is then stored in a buffer at the second user equipment. The second user equipment may reorder the packets so that the catch-up packets are accessed from the buffer, or "played out," in the order indicated by the segment numbers in the catch-up packets and the packets received over the shared unicast service data channel.

Figure 7:
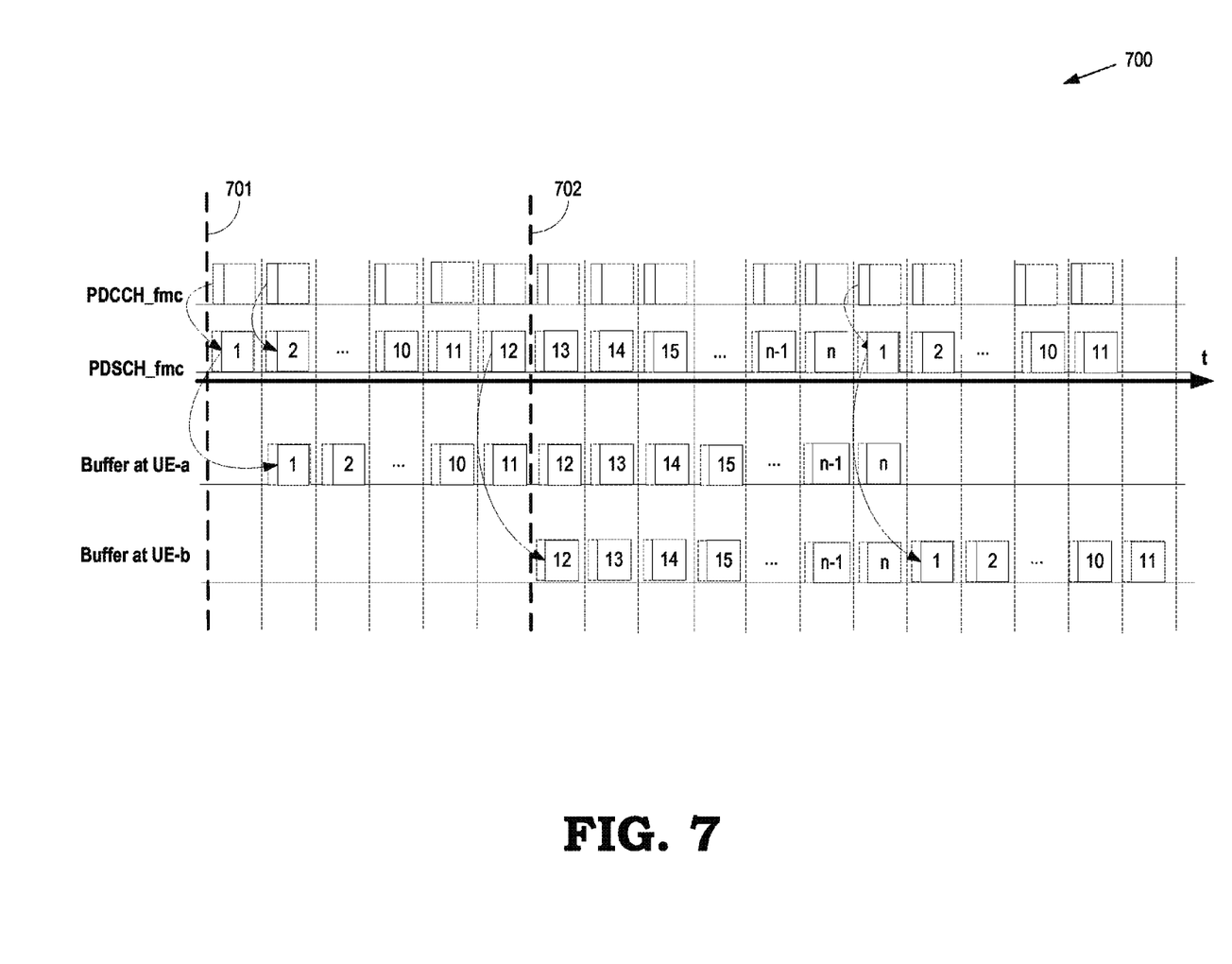
FIG. 7 is a timing diagram showing cyclical transmissions of content for a shared unicast service according to some embodiments.

FIG. 7 is a timing diagram 700 showing cyclical transmissions of content for a shared unicast service according to some embodiments. This transmission style is determined by the base station based on the service type information from the instruction from the content adapter. The service type in this case, for example, is the large file download. The timing diagram 700 may be implemented in some embodiments of the wireless communication system 100 shown in FIG. 1 or the reference architecture 300 shown in FIG. 3. The horizontal axis indicates time increasing from left to right. Channels and buffers are indicated in the vertical direction. In particular, FIG. 7 illustrates information transmitted by a base station on a shared unicast service control channel (PDCCH_fmc) associated with a shared service identifier for first and second user equipment and a shared unicast service data channel (PDSCH_fmc). FIG. 7 also depicts the contents of a buffer at the first user equipment (UE_a) and a buffer at the second user equipment (UE_b). The vertical dashed lines indicate RLC layer segment boundaries.

In the illustrated embodiment, the content of the shared unicast service includes a fixed amount of data that can be transmitted in a predetermined number of RLC segments. For example, the shared unicast service may be the service type "File Download" and may be used to provide a file (or more than one file) to user equipment that request the unicast service. The file is encoded in packets that can be transmitted in n RLC segments. The base station may then cyclically transmit the n RLC segments. For example, the base station may transmit the packets in the n RLC segments in the order indicated by the segment numbers and, when the n-th segment has been transmitted, the base station may begin transmitting the packets in the n RLC segments from the first segment. The cyclical transmissions of the n RLC segments may continue indefinitely, for a predetermined number of iterations, or as long as at least one user equipment has requested the unicast service.

Cyclically transmitting the packets in the n RLC segments allows user equipment to download all of the packets of content by decoding n consecutive segments, regardless of when the user equipment first requests the unicast service. For example, first user equipment may request the unicast service at time 701. The first user equipment receives the segments beginning with segments 1, 2, . . . over the shared unicast service data channel. The first user equipment may then store or buffer the received segments 1, 2, . . . in its buffer. The first user equipment continues to decode the segments received on the shared unicast service data channel until the first user equipment successfully decodes the n segments that include the content in the file (or files) provided by the unicast service.

The second user equipment requests the ongoing unicast service from the base station sometime after the time 701. In response to the request, the base station assigns the shared local service identifier to the second user equipment so that the second user equipment can decode the shared unicast service control channel and receive content transmitted over the shared unicast service data channel. The second user equipment begins receiving content at the time 702 and so the second user equipment begins receiving content at the segment 12. The second user equipment subsequently receives and decodes the segments 13, . . . , n, and stores the content in the decoded packets in its buffer. Since the unicast service is being cyclically transmitted on the shared unicast service data channel, the second user equipment can continue to monitor the shared unicast service data channel to receive and decode the segments 1, . . . 11. The decoded packets are stored in the buffer. The second user equipment may then reorder the packets based on the segment numbering to reconstruct the original file from the packets stored in the buffer. Consequently, the first and second user equipment both download the original file in n segments.

Embodiments of the timing diagrams 500, 600, 700 shown in FIG. 5, FIG. 6, and FIG. 7 may be combined in some embodiments. For example, the packet retransmission illustrated in the timing diagram 600 shown in FIG. 6 may be implemented in conjunction with transmission of the catch-up packets shown in the timing diagram 500 in FIG. 5 or in conjunction with cyclical transmission of the unicast service content shown in the timing diagram 700 in FIG. 7. For another example, concurrent transmission of unicast service content over a shared unicast service data channel and a user-specific dedicated data channel as shown in the timing diagram 500 in FIG. 5 may be implemented in conjunction with cyclical transmission of unicast service content shown in the timing diagram 700 in FIG. 7.

Figure 8:
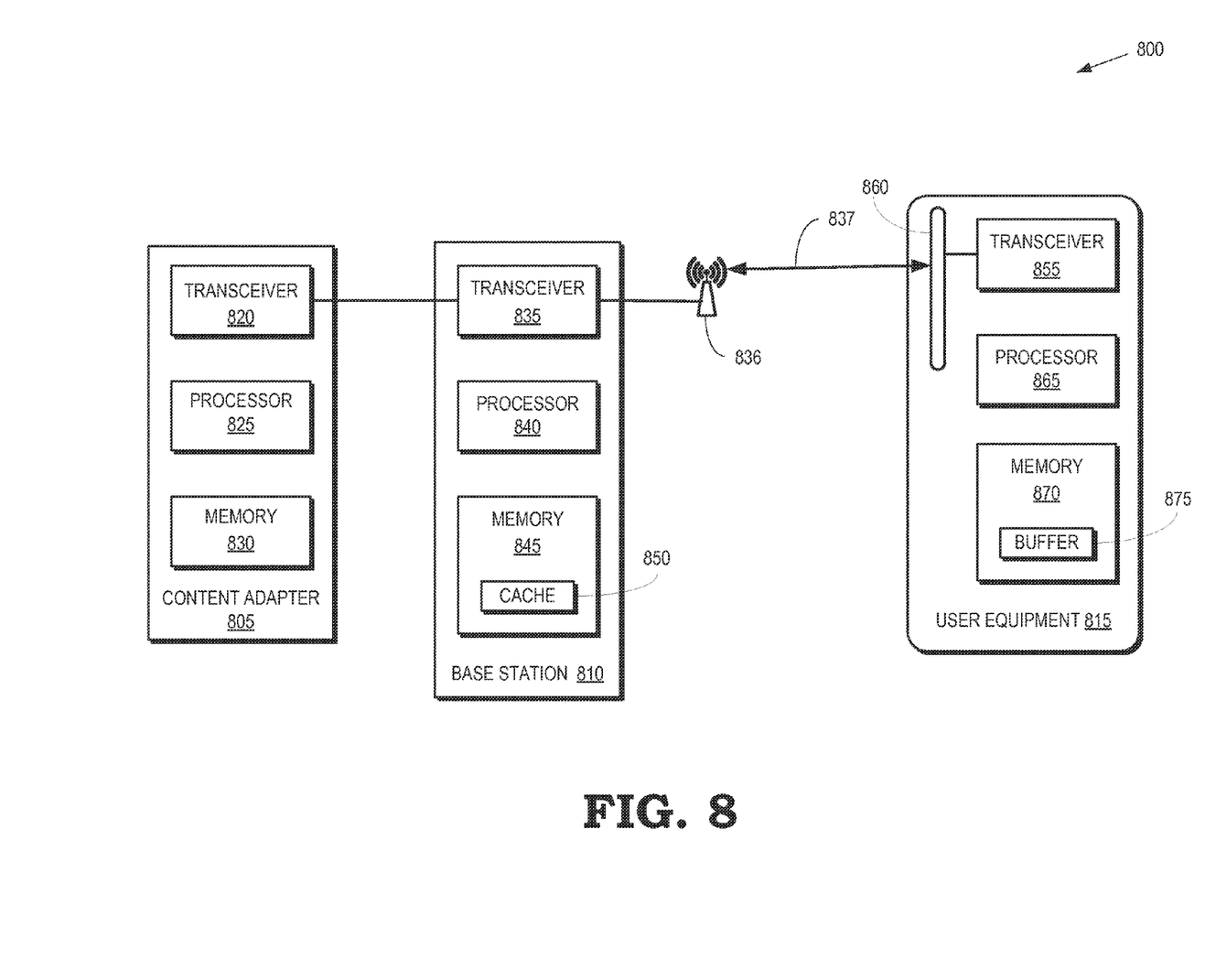
FIG. 8 is a block diagram of a wireless communication system according to some embodiments.

FIG. 8 is a block diagram of a wireless communication system 800 according to some embodiments. The communication system 800 includes a content adapter 805, a base station 810, and user equipment 815. Some embodiments of the content adapter 805 may be used to implement the content adapter 145 shown in FIG. 1 or the content adapter 347 FIG. 3. Some embodiments of the base station 810 may be used to implement one or more of the base stations 105, 110 shown in FIG. 1 or the base station 345 shown in FIG. 3 shown in FIG. 1. Some embodiments of the user equipment 815 may be used to implement the user equipment 111-115 shown in FIG. 1 or the user equipment 310 shown in FIG. 3.

The content adapter 805 includes a transceiver 820 for transmitting and receiving signals. The signals may be wired communication signals exchanged with the base station 810. The server 805 also includes a processor 825 and a memory 830. The processor 825 may be used to execute instructions stored in the memory 830 and to store information in the memory 830 such as the results of the executed instructions. Some embodiments of the processor 825 and the memory 830 may be configured to perform portions of the method 400 shown in FIG. 4 or implement aspects of the timing diagrams 500, 600, 700 shown in FIG. 5, FIG. 6, and FIG. 7, respectively.

The base station 810 includes a transceiver 835 for transmitting and receiving signals. The signals may be wired communication signals exchanged with the content adapter 805 or wireless communication signals exchanged with the user equipment 815. Some embodiments of the base station 810 are connected to one or more antennas 836 for transmitting or receiving signals over an air interface 837. The base station 810 also includes a processor 840 and a memory 845. The processor 840 may be used to execute instructions stored in the memory 845 and to store information in the memory 845 such as the results of the executed instructions. Some embodiments of the memory 845 may be used to implement a cache 850 for storing information received from the content adapter 805 and providing this information to the user equipment 815, as discussed herein. Some embodiments of the processor 825 and the memory 830 may be configured to perform portions of the method 400 shown in FIG. 4 or implement aspects of the timing diagrams 500, 600, 700 shown in FIG. 5, FIG. 6, and FIG. 7, respectively.

The user equipment 815 includes a transceiver 855 for transmitting and receiving signals via antenna 860. The transceiver 835 may therefore operate according to wireless communication standards or protocols. The user equipment 815 and the base station 810 may therefore communicate over the air interface 837. The user equipment 815 also includes a processor 865 and a memory 870. The processor 865 may be used to execute instructions stored in the memory 870 and to store information in the memory 870 such as the results of the executed instructions. Some embodiments of the memory 870 may implement one or more buffers 875 for buffering packets received over the air interface 837 from the base station 810. Some embodiments of the processor 865 and the memory 870 may be configured to perform portions of the method 500 shown in FIG. 5, the method 600 shown in FIG. 6, the method 700 shown in FIG. 7, or the method 800 shown in FIG. 8.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   allocating, at a base station, a service identifier to a first user equipment in response to the first user equipment requesting a unicast service that the base station is already providing to a second user equipment using the service identifier;
   transmitting, from the base station, content for the unicast service for reception by the first and second user equipment based on the service identifier, wherein transmitting the content for the unicast service comprises transmitting scheduling information on a first physical downlink control channel (PDCCH) using the service identifier, and wherein the scheduling information comprises scheduling information for the content transmitted over a first physical downlink shared channel (PDSCH); and
   allocating a first temporary identifier to the first user equipment and a second temporary identifier to the second user equipment, wherein the first and second temporary identifiers are different.

2. The method of claim 1, further comprising:
   receiving an indication that at least one of the first user equipment and the second user equipment did not successfully receive a packet of the content transmitted over the first PDSCH; and
   retransmitting the packet over at least one of the group consisting of a second PDSCH using the first temporary identifier and a third PDSCH using the second temporary identifier.

3. The method of claim 1, further comprising:
   transmitting at least one first packet of the content over the first PDSCH using the service identifier; and
   transmitting at least one second packet of the content over a second PDSCH using the first temporary identifier, wherein the at least one second packet was transmitted over the first PDSCH using the service identifier prior to transmission of the at least one first packet of the content over the first PDSCH.

4. The method of claim 1, further comprising:
   storing a portion of the content of the unicast service for a predetermined time interval in response to receiving an instruction to store the portion of the content of the unicast service.

5. A method comprising:
   allocating, at a base station, a service identifier to a first user equipment in response to the first user equipment requesting a unicast service that the base station is already providing to a second user equipment using the service identifier;
   transmitting, from the base station, content for the unicast service for reception by the first and second user equipment based on the service identifier, wherein transmitting the content for the unicast service comprises transmitting scheduling information on a first physical downlink control channel (PDCCH) using the service identifier, and wherein the scheduling information comprises scheduling information for the content transmitted over a first physical downlink shared channel (PDSCH); and
   cyclically transmitting a plurality of packets of the content over the first PDSCH using the service identifier so that the plurality of packets are retransmitted over the first PDCCH using the service identifier in response to completing transmission of the plurality of packets in a previous cycle.

6. The method of claim 5, further comprising:
   storing a portion of the content of the unicast service for a predetermined time interval in response to receiving an instruction to store the portion of the content of the unicast service.

7. A method comprising:
   allocating, at a base station, a service identifier to a first user equipment in response to the first user equipment requesting a unicast service that the base station is already providing to a second user equipment using the service identifier;
   transmitting, from the base station, content for the unicast service for reception by the first and second user equipment based on the service identifier;
   scheduling transmission of the content based on at least one of the group consisting of a first channel condition associated with the first user equipment and a second channel condition associated with the second user equipment; and
   increasing a priority associated with the unicast service in response to receiving a signal instructing the base station to allocate the service identifier to the first user equipment, and wherein scheduling the transmission of the content comprises scheduling the transmission of the content based on the priority associated with the unicast service.

8. The method of claim 7, further comprising:
   storing a portion of the content of the unicast service for a predetermined time interval in response to receiving an instruction to store the portion of the content of the unicast service.

* * * * *